(12) United States Patent
Seveček et al.

(10) Patent No.: US 12,026,929 B2
(45) Date of Patent: Jul. 2, 2024

(54) METHOD FOR USING TARGET PIXELS TO REMOVE OBJECTS FROM TEXTURE

(71) Applicant: LEICA GEOSYSTEMS AG, Heerbrugg (CH)

(72) Inventors: Pavel Seveček, Brno (CZ); Jan Zapletal, Ostrava-Poruba (CZ); Martina Bekrova, Prague (CZ)

(73) Assignee: LEICA GEOSYSTEMS AG, Heerbrugg (CH)

( * ) Notice: Subject to any disclaimer, the term of this patent is extended or adjusted under 35 U.S.C. 154(b) by 113 days.

(21) Appl. No.: 17/970,514

(22) Filed: Oct. 20, 2022

(65) Prior Publication Data

US 2023/0127188 A1 Apr. 27, 2023

(30) Foreign Application Priority Data

Oct. 21, 2021 (EP) .................................... 21204032

(51) Int. Cl.
*G06V 10/26* (2022.01)
*G06T 5/77* (2024.01)
(Continued)

(52) U.S. Cl.
CPC ................ *G06V 10/26* (2022.01); *G06T 5/77* (2024.01); *G06T 7/10* (2017.01); *G06T 7/194* (2017.01);
(Continued)

(58) Field of Classification Search
CPC ...... G06V 10/26; G06V 10/764; G06V 20/17; G06V 20/70; G06V 2201/07;
(Continued)

(56) References Cited

U.S. PATENT DOCUMENTS 9,437,034 B1 9/2016 Wei et al.
10,303,966 B2 5/2019 Coulter
(Continued)

FOREIGN PATENT DOCUMENTS

KR 2020-0080190 A 7/2020

OTHER PUBLICATIONS

Yang, et al. "Moving car recognition and removal for 3D urban modelling using oblique images." Remote Sensing 13.17 (2021): 3458 (Year: 2021).*

(Continued)

*Primary Examiner* — Maurice L. McDowell, Jr.
(74) *Attorney, Agent, or Firm* — Maschoff Brennan (57) ABSTRACT

A method for creating a texture from input images, thereby removing representations of objects from the texture, the method comprising performing semantic segmentation in a plurality of digital input images with a plurality of semantic classes, at least one of the semantic classes relating to a target object class; identifying, in at least a first input image, one or more possible instances of representations of objects belonging to the target object class, each possible instance being constituted by a plurality of contiguous instance pixels of the image pixels; determining whether the instance pixels are target pixels, target pixels being pixels constituting a representation of an object belonging to the target object class; and replacing target pixels in the texture with replacement pixels derived from one or more of the plurality of digital input images.

19 Claims, 5 Drawing Sheets

(51) Int. Cl.
   *G06T 7/10*      (2017.01)
   *G06T 7/194*     (2017.01)
   *G06T 7/215*     (2017.01)
   *G06T 7/50*      (2017.01)
   *G06T 7/55*      (2017.01)
   *G06T 7/70*      (2017.01)
   *G06T 15/04*     (2011.01)
   *G06T 15/60*     (2006.01)
   *G06T 17/20*     (2006.01)
   *G06V 10/764*    (2022.01)
   *G06V 20/17*     (2022.01)
   *G06V 20/70*     (2022.01)

(52) U.S. Cl.
   CPC .............. *G06T 7/215* (2017.01); *G06T 7/50* (2017.01); *G06T 7/55* (2017.01); *G06T 7/70* (2017.01); *G06T 15/04* (2013.01); *G06T 15/60* (2013.01); *G06T 17/20* (2013.01); *G06V 10/764* (2022.01); *G06V 20/17* (2022.01); *G06V 20/70* (2022.01); *G06T 2207/10012* (2013.01); *G06T 2207/10028* (2013.01); *G06T 2207/10032* (2013.01); *G06T 2207/20021* (2013.01); *G06V 2201/07* (2022.01); *G06V 2201/08* (2022.01)

(58) Field of Classification Search
   CPC ...... G06V 2201/08; G06V 10/82; G06T 5/77; G06T 7/10; G06T 7/194; G06T 7/215; G06T 7/50; G06T 7/55; G06T 7/70; G06T 15/04; G06T 15/60; G06T 17/20; G06T 2207/10012; G06T 2207/10028; G06T 2207/10032; G06T 2207/20021; G06T 2207/20084; G06T 7/38; G06T 5/50; G06T 7/20; G06T 3/04

See application file for complete search history.

(56) References Cited

U.S. PATENT DOCUMENTS

2009/0079752 A1\* 3/2009 Wexler ................... G06T 15/04
                                                    345/582
   2019/0340446 A1\* 11/2019 Li ........................ G06V 10/267
   2021/0390351 A1\* 12/2021 St. Romain, II .... G06F 18/2178
   2022/0327813 A1\* 10/2022 Shibata ................ G06V 10/762

OTHER PUBLICATIONS

Ceylan Duygu, et al., "Coupled structure-from-motion and 3D symmetry detection for urban facades," ACM Transactions on Graphics, vol. 33, Issue 1, pp. 1-15 (Feb. 7, 2014).

Kentaro Yagi, et al., "Diminished Reality for Privacy Protection by Hiding Pedestrians in Motion Image Sequences Using Structure from Motion," IEEE International Symposium On Mixed and Augmented Reality, pp. 334-337 (Oct. 9, 2017).

Shuang Luo, et al., "Shadow removal based on separated illumination correction for urban aerial remote sensing images," Signal Processing, Elsevier, Amsterdam, vol. 165, pp. 197-208 (Jul. 1, 2019).

Extended European Search Report dated Apr. 21, 2022 as received in Application No. 21204032.3.

\* cited by examiner

METHOD FOR USING TARGET PIXELS TO REMOVE OBJECTS FROM TEXTURE

BACKGROUND

The present disclosure pertains to a computer-implemented method for creating a texture of an area from a plurality of input images, thereby removing representations of objects that are imaged in one or more of the input images from the texture. In particular, the texture is used for texturing a three-dimensional mesh of the area, and the removed objects are moving vehicles such as cars.

The increasing amount of traffic in cities is a problem from many points of view. With respect to texturing of 3D meshes modelling landscapes and cities, traffic leads to crowded and visually rather unpleasing results. For many applications it is thus desirable to remove vehicles from the texture.

The detection of moving objects in images is an established topic of research. Several different approaches exist based on comparing images taken at different camera positions and at least partly capturing the same scene. These approaches include, e.g., "frame difference methods", "background subtraction methods", or approaches based on the dis-continuities in the optical flow field. In general, such methods rely on a direct comparison of several photos or subsequent video frames. For instance, U.S. Pat. No. 10,303,966 B2 discloses a method of image-based change detection.

SUMMARY

It is an object of the present disclosure to provide an improved computer-implemented method for automatically generating a texture from a plurality of input images, wherein certain objects that are imaged in the input images are not imaged in the texture.

It is another object to provide such a method that allows reducing or preventing artefacts in the texture.

It is another object to provide such a method wherein the removed objects are moving objects, particularly vehicles.

It is another object to provide such a method wherein the objects are replaced by a realistic background.

It is another object to provide such a method wherein the texture can be used for texturing a 3D triangular mesh of an area.

At least one of these objects is achieved by the computer-implemented method, the computer system and/or the dependent claims as described herein.

A first aspect pertains to a computer-implemented method for automatically generating a texture of an area based on a plurality of digital input images. The method comprising the following steps that are performed in a computer system:

receiving the plurality of digital input images, each input image at least partly imaging the area and comprising a multitude of image pixels, each input image being captured from a known position and with a known orientation relative to a common coordinate system;

performing semantic segmentation in at least a subset of the input images, the semantic segmentation being performed with a plurality of semantic classes, at least one of the semantic classes relating to a target object class, wherein representations of objects belonging to the target object class are not to be imaged in the generated texture;

identifying, in at least a first input image (e.g. in a subset of the input images or in all input images), one or more possible instances of representations of objects belonging to the target object class, each possible instance being constituted by a plurality of contiguous instance pixels of the image pixels;

determining whether the instance pixels are target pixels that are to be removed from the texture, target pixels being pixels constituting a representation of an object belonging to the target object class; and replacing target pixels in the texture with replacement pixels derived from one or more of the plurality of digital input images.

According to this aspect, the step of determining whether the instance pixels are target pixels comprises:

using at least a first structure-from-motion (SfM) algorithm and the known positions and orientations to combine the individually segmented input images into a single 3D model;

mapping the instance pixels to the common coordinate system;

projecting the mapped instance pixels to at least a subset of the other input images, the subset comprising at least those other input images that image the same spot of the area as the mapped instance pixels; and determining, based on the segmentation of a plurality of input images, whether the mapped instance pixels constitute a representation of an object belonging to the target object class.

According to some embodiments, the method comprises assigning the texture comprising the replacement pixels to a 3D mesh of the area to generate a textured mesh of the area. For instance, the 3D mesh is a three-dimensional triangular mesh.

In some embodiments, the method further comprises receiving the 3D mesh of the area and/or requesting the plurality of input images from a database based on the 3D mesh.

According to some embodiments of the method, the target pixels are pixels constituting a representation of a moving object belonging to the target object class (e.g. a moving vehicle), and the method further comprises determining, based on the 3D model and/or using the first or a second SfM algorithm, whether the mapped instance pixels constitute a representation of a moving object. In some embodiments, replacing mapped instance pixels comprises replacing only those mapped instance pixels that constitute a representation of a moving object belonging to the target object class.

In some embodiments, the possible instances of representations of objects belonging to the target object class are identified, in a plurality of the input images (e.g. in all input images) separately, and the plurality of input images are combined to detect whether the objects are moving objects. For instance, if the object is not visible in a subset of images (e.g. more than half of the images) in which the position of the object can be seen (taking into account occlusion information), the object is considered to be moving.

According to some embodiments, combining the individually segmented input images into the single 3D model comprises projecting and back-projecting points between world and cameras, i.e. real-world points and image points.

According to some embodiments, a plurality of neighbouring instance pixels are defined as a component of pixels, wherein determining whether the mapped instance pixels constitute a representation of a moving object comprises using aggregated values from the pixels of the component and using the same aggregated values for all pixels of the component; and/or assigning a data cost and a smoothness cost to each pixel of the component and solving an optimization problem, particularly using a graph-cut algorithm.

According to some embodiments of the method, a plurality of neighbouring instance pixels are defined as a component of pixels, and determining whether the mapped instance pixels constitute a representation of an object belonging to the target object class, comprises using aggregated values from the pixels of the component and using the same aggregated values for all pixels of the component.

According to some embodiments of the method, the texture shows an aerial view of the area (e.g. nadir or oblique), and one or more of the input images are aerial images, for instance wherein the texture is or comprises an orthoimage of the area.

According to some embodiments, the texture is based on the one or more input images that are aerial images, e.g. at least the first input image being an aerial image. The aerial images may be captured by one or more aerial cameras mounted at satellites, airplanes or unmanned aerial vehicles.

Optionally, at least those pixels of the texture that are not replacement pixels are based on the one or more input images that are aerial images.

According to some embodiments, at least one additional input image of the input images is not an aerial image, for instance an image captured by a fixedly installed camera.

According to some embodiments, the method comprises creating a mask, e.g. a binary mask, for at least the first input image based on the segmentation, e.g. for each input image or at least for a subset of the other input images.

According to some embodiments of the method, performing the semantic segmentation comprises assigning to each of the pixels of the at least first input image one of the plurality of semantic classes. For instance, the plurality of semantic classes may comprise
- exactly two classes, comprising the target class and a second class that is not a target class, and/or
- a plurality of target classes.

According to one embodiment of the method, the replacement pixels comprise authentic background pixels, e.g. if the target pixels are pixels constituting a representation of a moving object, the authentic background pixels being directly derived from an actual texture imaged in one or more of the input images at the spot of the target pixels that are replaced by the replacement pixels.

According to another embodiment of the method, the replacement pixels comprise plausible background pixels, e.g. if the target pixels are pixels constituting a representation of a non-moving object, wherein the plausible background pixels are derived from texture imaged in one or more of the input images at or around the spot of the target pixels that are replaced by the replacement pixels, the plausible background pixels for instance being computed using content awareness and/or machine learning.

According to some embodiments, the method comprises detecting, in one or more of the input images, shadows of objects belonging to the target object class, representations of the shadows being constituted by shadow pixels, and replacing the shadow pixels by shadow replacement pixels, the texture assigned to the 3D mesh comprising the shadow replacement pixels. In some embodiments, detecting the shadows is based on an intensity histogram in the vicinity of the target pixels, and/or comprises using a graph-cut algorithm.

According to another embodiment of the method, the plurality of input images comprise at least fifteen images, particularly at least thirty images, and/or are captured by at least five cameras from different positions and with different orientations, the positions and orientations of the cameras relative to the general coordinate system being known.

A second aspect pertains to a computer system comprising a processing unit and a data storage unit. The data storage unit is configured to receive and store input data, to store one or more algorithms, and to store and provide output data, the input data particularly comprising input image data and 3D mesh data, the algorithms comprising at least one SfM algorithm. The processing unit is configured to use the algorithms to generate, based on the input data, a texture and/or a textured mesh as output data by performing the method according to the first aspect.

A third aspect pertains to a computer programme product comprising programme code which is stored on a machine-readable medium, or being embodied by an electromagnetic wave comprising a programme code segment, and having computer-executable instructions for performing, particularly when executed on a processing unit of a computer system according to the second aspect, the method according to the first aspect.

BRIEF DESCRIPTION OF THE DRAWINGS

Aspects will be described in detail by referring to exemplary embodiments that are accompanied by figures, in which.

DETAILED DESCRIPTION

Figure 1:
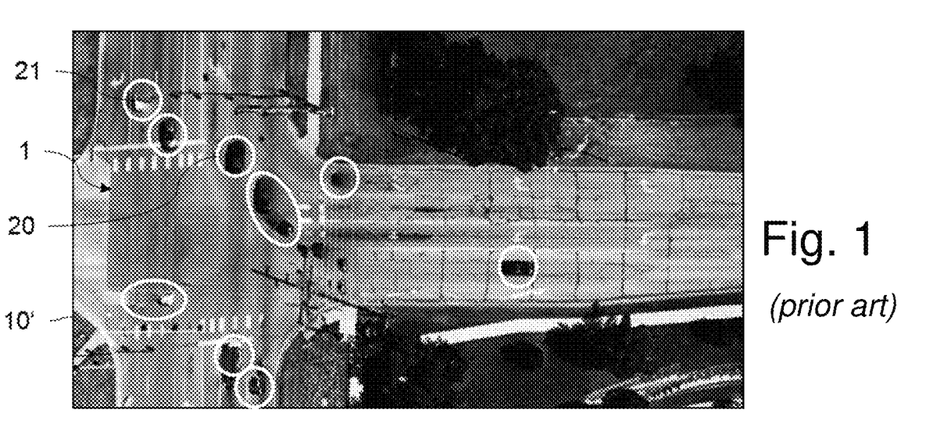
FIG. 1 shows the result of a first prior art approach for generating texture.
Figure 2:
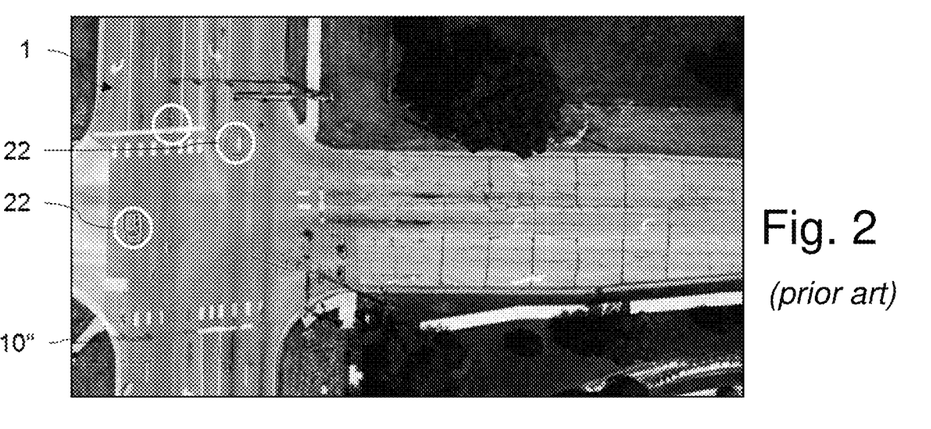
FIG. 2 shows the result of a second prior art approach for generating texture.

FIGS. 1 and 2 illustrate two different approaches generally known in the art for providing texture 10', 10" for a three-dimensional (3D) triangular mesh. Both figures show a textured 3D triangular mesh of an area 1 comprising a crossroads.

In FIG. 1, the texture 10' of the mesh is based on sampling the best image available in a per-pixel manner. This leads to the inclusion of moving objects such as cars 20, some of them not being sampled completely and creating artefacts 21.

In FIG. 2, the texture 10" of the mesh is based on sampling all available images and computing a median. Although the cars are thus not directly visible, the algorithm leads to so-called ghosting artefacts 22. Cars 20 and artefacts 21, 22 are accentuated by white circles in FIGS. 1 and 2.

Figure 3:
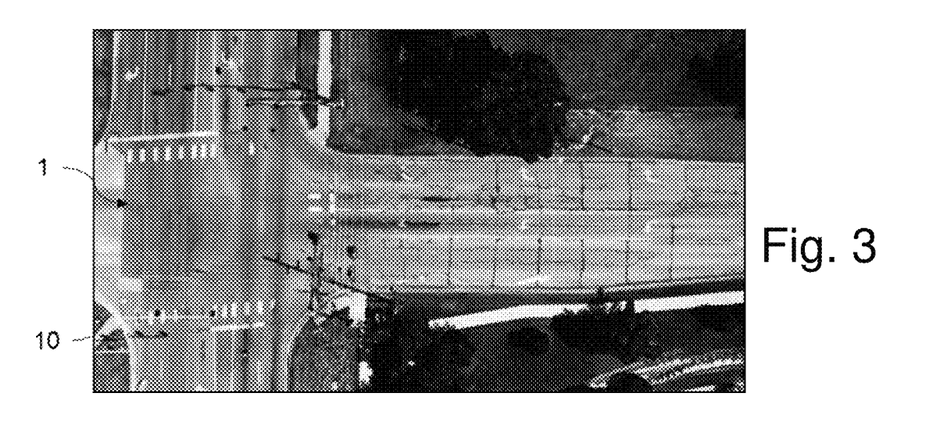
FIG. 3 shows the result of an exemplary approach for generating texture.

FIG. 3 shows the result of an exemplary approach for generating texture. This approach uses an algorithm which prevents the above-mentioned effects and creates an eye-pleasing texture without moving objects 20 and without artefacts 21, 22. The method comprises two main stages. In a first stage, the images are segmented into several semantic classes including vehicles or other moving objects that should be removed from the images or textures. This stage may be run on every input image separately and by itself cannot detect whether the vehicles are actually moving or not, e.g. whether they are parked. This segmentation stage is based on known approaches and publicly available neural networks trained on data processed by the computer vision pipeline. The second stage is based on structure-from-motion (SfM) approaches combining the segmented imagery into a single 3D model which allows detection of moving objects. In addition to moving vehicles, in some embodiments, the algorithm is capable of removing non-moving objects and/or shadows of removed objects, which otherwise would contribute to visual artefacts. Optionally, generating the 3D model additionally comprises using depth or range information that is captured using 3D scanners (e.g. LIDAR), stereo cameras and/or range-imaging cameras.

Figure 4:
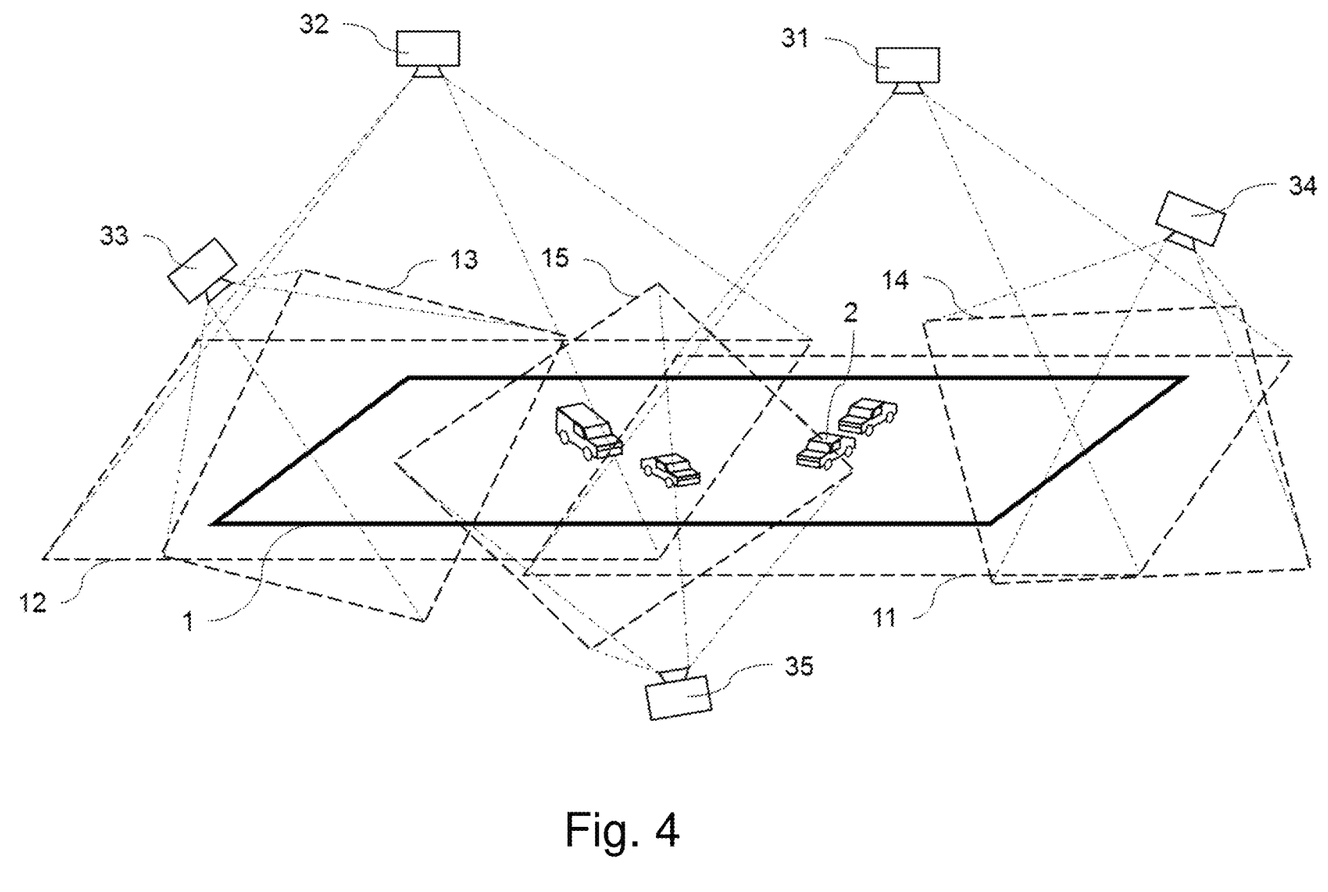
FIG. 4 shows an exemplary distribution of cameras for capturing images of an area as a source for the texture.
Figure 5:
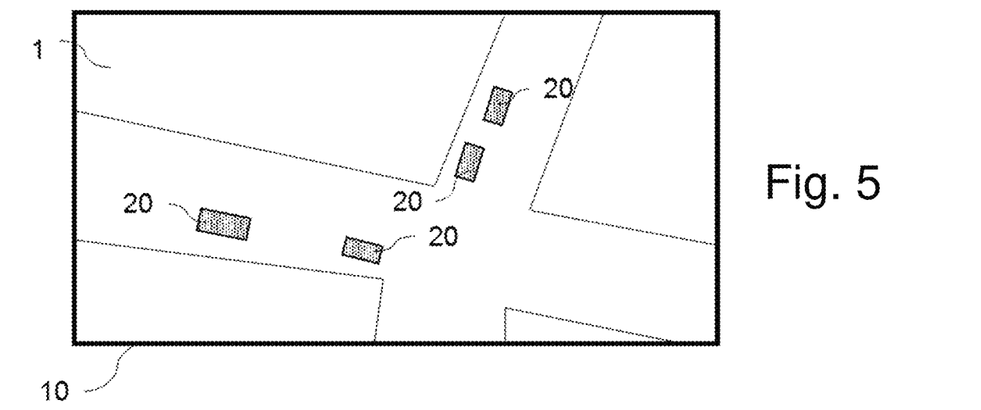
FIG. 5 shows moving objects in the area of FIG. 4 that are to be removed from the texture.

FIG. 4 shows an exemplary camera distribution for capturing images of an area 1 as a source for texture of the mesh of the area. The area 1 comprises a number of vehicles 2, e.g. moving and stationary cars, wherein at least moving vehicles should not be seen in the resulting texture. FIG. 5 shows an aerial view as a texture 10 corresponding to the area 1 of FIG. 4, with representations 20 (i.e. images) of the moving vehicles that need to removed.

The cameras in FIG. 4 comprise a number of aerial cameras 31, 32 which capture digital images of the area 1 with an aerial view, i.e. nadir or oblique images. These cameras 31, 32 may be mounted on satellites, airplanes or unmanned aerial vehicles (UAV). The aerial cameras 31, 32 may capture several different aerial images 11, 12 of the same area 1 or of different parts of the same area 1 from different positions. The cameras further comprise a number of additional (i.e. non-aerial) cameras 33-35 which capture digital images 13-15 of parts of the area 1 from different positions. Some of these cameras may be fixedly installed in the area 1, i.e. as surveillance cameras, others may be installed on ground vehicles moving through the area 1. Preferably, the positions and orientations of the cameras while capturing the images is known, e.g. with respect to a common coordinate system. Alternatively, the relative positions and orientations need to be deduced from the captured images, e.g. using image overlaps and image-recognition approaches.

In some embodiments, at least a subset of the cameras 31-35 is embodied as stereo cameras or range-imaging cameras providing depth information and/or allowing feature or topography extraction. Also, data from one or more LIDAR devices or 3D laser scanners (not shown here) may be used for providing depth or range information.

Semantic segmentation is performed on all input images 11-15 independently of each other. The input images can be captured at various locations, with different camera systems, under possibly different lightning conditions and can span a range of resolutions. For instance, the ground sample distance (GSD) in each image may vary between 2 and 15 cm.

The segmentation stage may be based on publicly available neural networks trained on data processed by a computer vision pipeline. This includes using a training dataset and various data augmentation techniques during the training to ensure generality of the model. For image semantic segmentation, publicly available up-to-date neural network architectures may be used. Suitable network architectures comprise, e.g., "Deeplab v3+" or "Hierarchical Multi-Scale Attention". Once the network is trained, every input image 11-15 is processed by tiles and segmented into desired classes.

Object instances may be determined as connected components of pixels of the same class. Alternatively, also instance semantic segmentation may be used for identifying moving objects. A direct segmentation of object instances can further improve the results.

The individually segmented input images are combined into a single 3D model using SfM algorithms. In the texturing process, preferably, the cameras should be calibrated and possibly linearised to allow easy transition between the points in real world (world points) and the pixels in the individual images capturing the respective world point.

Figure 6:
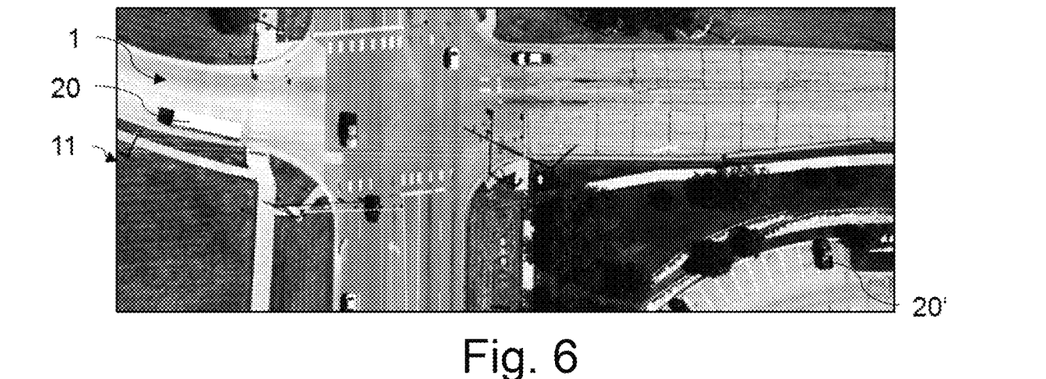
FIG. 6 shows an exemplary input image of an area including moving and stationary vehicles.

FIG. 6 is an example of an input image 11 of the area 1, which serves as a texturing source. Texturing sources are images that are used for creating the texture. Some or all of the input images may be used as texturing source, or the texturing source can be an intermediate source created based on one or more input images. The input image 11 includes, both, moving vehicles 20 and stationary vehicles 20'.

The input image 11 is segmented, and every pixel of the input image 11 is assigned a probability that it belongs to a specific class. This means that every pixel is assigned a set of probabilities for every class supported in the machine learning model. For the purpose of removing certain kinds of objects, the number of different classes needs to be at least two (e.g. "object to be removed" and "other"). However, the actual number of classes can be higher. For instance, the model may support at least 20 to 30 different classes.

In the present example, where vehicles are to be removed, the plurality of classes at least comprises one class related to vehicles. This can either be a single class "vehicle", or a plurality of classes for different types of vehicles, such as "car", "bus", "truck" or "train". Other classes, i.e. relating to objects that should be shown in the texture, may include "building", "road", "traffic sign", "street furniture" or "tree". Of course, this method is not limited to the detection and removal of moving vehicles but can be applied in the same manner to any object moving across the imagery or video frames such as, e.g., people, cloud shadows etc. This would require the machine learning model to provide a label for such a class.

By itself, the probability data can be noisy, since two or more classes can have a similar probability. Also, (i.a. depending on the number of classes) the class with the highest probability can still be relatively low. Thus, the confidence is enhanced by a combination with the other input images that—at least partly—capture the same scene.

Figure 7:
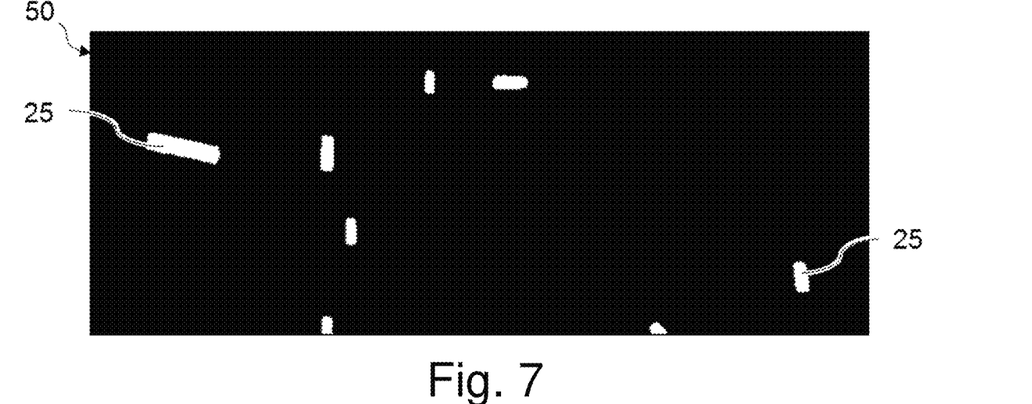
FIG. 7 shows a binary mask of vehicles recognized in the input image of FIG. 6.

In FIG. 7 a binary validity mask 50 is depicted for vehicles detected in FIG. 6. The image 11 of FIG. 6 is processed to create a validity mask 50 defining pixels which can be sampled for the purposes of texture creation. The shown binary validity mask 50 is based on the most probable class, wherein the class "vehicle" (not necessarily moving) is masked (represented here by white areas 25). The individual instances of the objects are further treated separately. Such a mask can be created for every image based on the segmentation.

Figure 8:
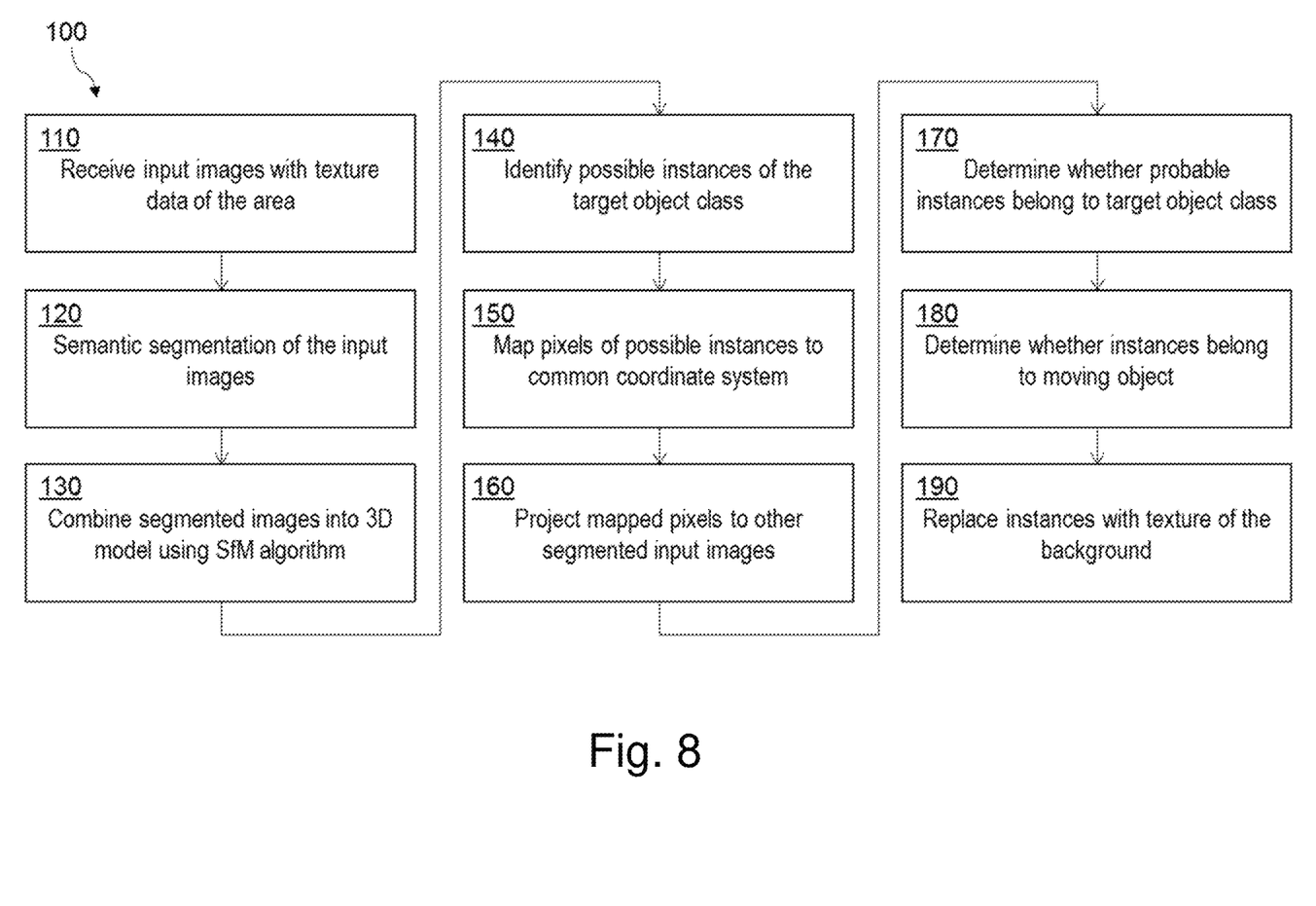
FIG. 8 shows a flow chart illustrating steps of an exemplary embodiment of a method.

FIG. 8 shows a flow chart illustrating steps of an exemplary embodiment of a method 100.

The method starts with receiving 110 a plurality of digital input images that comprise texture data of the area. Semantic segmentation 120 is performed on the input images and, for at least a subset of the input images, particularly for every image, a mask is created based on the segmentation.

The individual object instances may then be treated separately. For every pixel of a given instance in one of the input images, mapping 150 to a common coordinate system (world coordinates) is performed and the mapped pixels are projected 160 to all other input images provided by other cameras capturing this particular spot in the scene. The set of input images used for this purpose may be limited by the position of the cameras, and further, e.g., by the angle of the ray, occlusions and other aspects influencing visibility, camera resolution, and quality of the projection.

Based on the segmentation of the individual images, it is then determined 170, whether the probable instances indeed fall in to the assumed category, i.e. belong to the target object class. If a subset of images were taken at the same moment in time, this could be described as a vote from all used images, on whether or not the pixels imaging the world point belongs to the target object class. Otherwise, the detection of the category may be performed on a per-image basis.

If an instance has been determined to belong to the target object class, it is then determined 180 whether this instance is moving. If the aggregated data hint that the object (e.g. vehicle) is not imaged at the same spot in all of the images, e.g. visible only in a minority of images, the respective pixels of the object are marked as moving.

The above procedure (i.e. at least steps 170 and 180) is applied on a per-pixel basis. Since it can be expected that neighbouring pixels are most probably either moving or stationary together, one can aggregate the data from the whole component to each pixel of the component in order to improve continuity of the mask. For instance, if a majority of pixels of the component is determined to be moving, the whole component is assumed to be moving. Alternatively, a data cost and a smoothness cost may be assigned to each pixel of the component, and consequently an optimization problem may be solved using, e.g., a graph-cut algorithm.

When the moving instances have been detected, optionally also their shadows may be detected, since these contribute to the visual artefacts. This procedure is based on an intensity histogram in the vicinity of the object. To enforce continuity, again a graph-cut approach can be used. If the dilated shadow area intersects the object, it is masked as a shadow, otherwise it is dropped.

Figure 9:
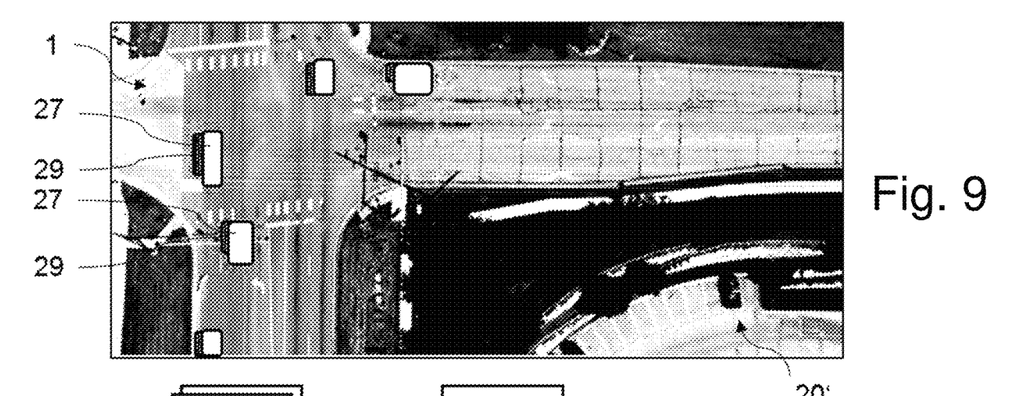
FIG. 9 shows an input image, wherein moving objects and their shadows are masked.

FIG. 9 shows an image of the area 1, wherein only moving vehicles (white areas 27) and their shadows (dark areas 29) are masked. The pixels belonging to the masked areas 27, 29, i.e. imaging a moving vehicle or its shadow, are replaced by replacement pixels. The resulting texture for texturing a 3D mesh is depicted in FIG. 3.

Often, replacement pixels can be taken directly from one or more of the input images and thus show a real background behind the removed object. In the case of a vehicle being removed from an aerial image, this background may be a road surface below the vehicle. However, sometimes, for some pixels no real background can be taken from the input images. This may occur if the cameras are not positioned optimally, so that only few cameras have a line of sight to the exact spot of an object that is to be removed, or if moving objects block the line of sight to the spot. Also heavy traffic may be a reason, i.e. if the same pixels are blocked by different vehicles in all available input images. The replacement pixels then need to be computed artificially, e.g. using some content aware approach and/or machine learning. Such computed replacement pixels ("plausible replacement pixels") show a plausible background which may deviate somewhat from the real background.

FIG. 9 shows a parked car 20' that is not masked by the algorithm since it is visible at this spot in all input images and thus detected as not moving. With some embodiments of the method also non-moving objects like parked cars 20' may be removed. This is possible using the same machine learning model as for moving objects. However, since the background of such non-moving objects is always occluded in all input images, plausible replacement pixels will have to be used that have to be artificially computed.

Figure 10:
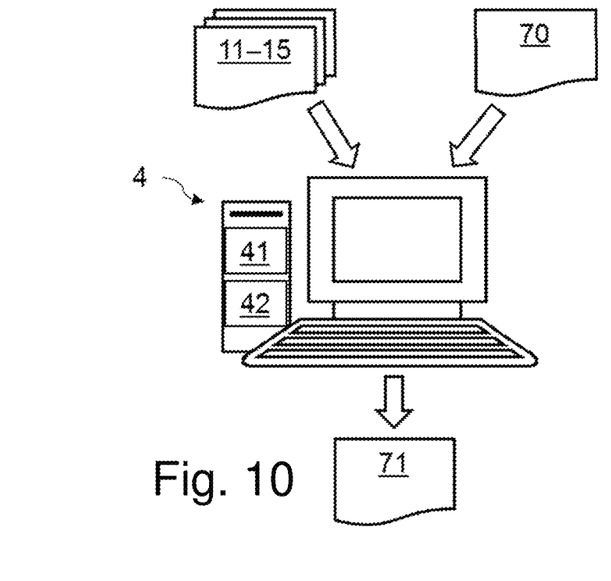
FIG. 10 shows an exemplary computer system for performing a method.

FIG. 10 illustrates an exemplary computer system for executing a method. The depicted computer 4 comprises a processing unit 41 and a storage unit 42. The storage unit 42 is configured to store algorithms for executing the method, i.e. structure-from-motion (SfM) algorithms and machine-learning (ML) algorithms. It is also configured to store received input data, generated output data and any intermediate data generated in the process. The computer 4 receives the plurality of input images 11-15 and the 3D mesh of the area and calculates and outputs the textured mesh 71, wherein the texture of the mesh does not show the removed objects. Of course, instead of a single computer 4 as shown here, cloud computing may be used as well. The textured mesh 71 may be output on a display of the computer 4 and/or provided to other computer systems, e.g. via an Internet connection. Optionally, the computer may receive the 3D mesh to be textured and then determine, based on the mesh, a plurality of images that are needed to generate the texture 10. This plurality may be requested, e.g. from an internal or external database, and subsequently received as the input images 11-15.

Figure 11:
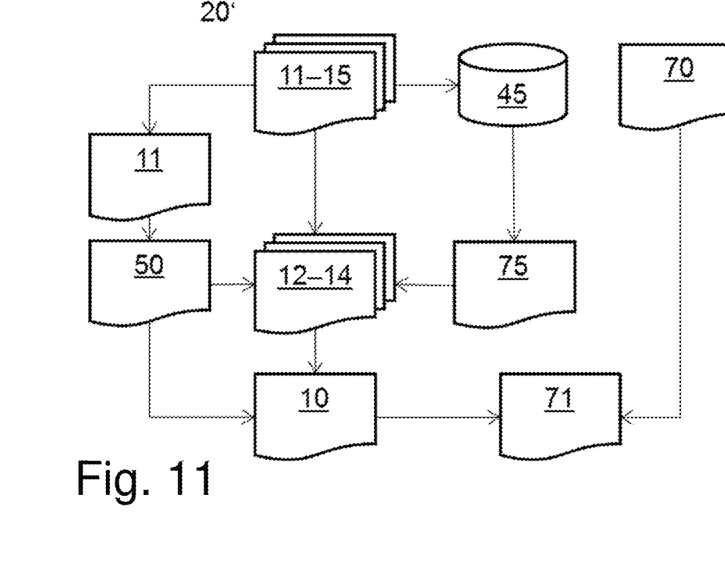
FIG. 11 illustrates an exemplary generation of data within the computer system while performing a method.

FIG. 11 illustrates a flow of data in a computer system, e.g. the computer 4 of FIG. 10, while performing an exemplary method. An SfM algorithm 45 of the computer system generates a 3D model 75 using the plurality input images 11-15—and optionally additionally from depth information or range information. Semantic segmentation is performed for at least a first input image 11 of the plurality of input images 11-15 and a binary mask 50 is created to mask probable instances of target objects to be removed (e.g. all moving vehicles). The 3D model 75 is used to determine, which of the other input images show the same spots as the probable instances in the first image 11, i.e. those masked in the binary mask 50. In this example, one of the other input images (image 15) has no sufficient image data for any of these spots, so that only images 12-14 are used to verify whether the probable instances in the mask 50 indeed show target objects that should be removed. To do so, semantic segmentation is performed for at least also these images 12-14.

After this verification, the verified target objects are removed by replacing the respective pixels with pixels showing a background (real or computed) of each removed target object, so that a texture 10 is created. This texture 10 is laid over a provided 3D triangular mesh 70 to create the textured mesh 71 as output data.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A computer-implemented method for automatically generating a texture of an area based on a plurality of digital input images, the method comprising, in a computer system, receiving the plurality of digital input images, each input image at least partly imaging the area and comprising a multitude of image pixels, each input image being captured from a known position and with a known orientation relative to a common coordinate system;

performing semantic segmentation in at least a subset of the input images, the semantic segmentation being performed with a plurality of semantic classes, at least one of the semantic classes relating to a target object class, wherein representations of objects belonging to the target object class are not to be imaged in the generated texture;

identifying, in at least a first input image, one or more possible instances of representations of objects belonging to the target object class, each possible instance being constituted by a plurality of contiguous instance pixels of the image pixels;

determining whether the instance pixels are target pixels that are to be removed from the texture, target pixels being pixels constituting a representation of an object belonging to the target object class; and replacing target pixels in the texture with replacement pixels derived from one or more of the plurality of digital input images, wherein determining whether the instance pixels are target pixels comprises:
using at least a first structure-from-motion algorithm and the known positions and orientations to combine the individually segmented input images into a single 3D model;
mapping the instance pixels to the common coordinate system;
projecting the mapped instance pixels to at least a subset of the other input images, the subset comprising at least those other input images that image the same spot of the area as the mapped instance pixels; and
determining, based on the segmentation of a plurality of input images, whether the mapped instance pixels constitute a representation of an object belonging to the target object class.

2. The method according to claim 1, comprising assigning the texture comprising the replacement pixels to a three-dimensional mesh of the area to generate a textured mesh of the area, particularly wherein the method comprises
receiving the three-dimensional mesh of the area; and/or
requesting the plurality of input images from a database based on the received three-dimensional mesh,
wherein the three-dimensional mesh is a three-dimensional triangular mesh.

3. The method according to claim 2, wherein
the target pixels are pixels constituting a representation of a moving object belonging to the target object class, and
the method further comprises determining, based on the 3D model and/or using the first or a second structure-from-motion algorithm, whether the mapped instance pixels constitute a representation of a moving object, and
replacing mapped instance pixels comprises replacing only those mapped instance pixels that constitute a representation of a moving object belonging to the target object class.

4. The method according to claim 1, wherein
the target pixels are pixels constituting a representation of a moving object belonging to the target object class, and
the method further comprises determining, based on the 3D model and/or using the first or a second structure-from-motion algorithm, whether the mapped instance pixels constitute a representation of a moving object, and
replacing mapped instance pixels comprises replacing only those mapped instance pixels that constitute a representation of a moving object belonging to the target object class.

5. The method according to claim 4, wherein a plurality of neighbouring instance pixels are defined as a component of pixels, wherein determining whether the mapped instance pixels constitute a representation of a moving object comprises:
using aggregated values from the pixels of the component and using the same aggregated values for all pixels of the component; and/or
assigning a data cost and a smoothness cost to each pixel of the component and solving an optimization problem, particularly using a graph-cut algorithm.

6. The method according to claim 1, wherein
a plurality of neighbouring instance pixels are defined as a component of pixels, and
determining whether the mapped instance pixels constitute a representation of an object belonging to the target object class, comprises using aggregated values from the pixels of the component and using the same aggregated values for all pixels of the component.

7. The method according to claim 1, wherein the texture shows an aerial view of the area, and one or more of the input images are aerial images, particularly wherein the texture is an orthoimage of the area.

8. The method according to claim 7, wherein the texture is based on the one or more input images that are aerial images, and wherein:
the first input image is an aerial image;
at least those pixels of the texture that are not replacement pixels are based on the one or more input images that are aerial images; and/or
the aerial images are captured by one or more aerial cameras mounted at satellites, airplanes or unmanned aerial vehicles.

9. The method according to claim 8, wherein at least one additional input image of the input images is not an aerial image, in particular an image captured by a fixedly installed camera.

10. The method according to claim 7, wherein at least one additional input image of the input images is not an aerial image, in particular an image captured by a fixedly installed camera.

11. The method according to claim 1, comprising creating a mask, particularly a binary mask, for at least the first input image based on the segmentation, particularly for each input image or at least for a subset of the other input images.

12. The method according to claim 1, wherein performing the semantic segmentation comprises assigning to each of the pixels of the at least first input image one of the plurality of semantic classes, particularly wherein the plurality of semantic classes comprises
exactly two classes, comprising the target class and a second class that is not a target class; and/or
a plurality of target classes.

13. The method according to claim 1, the replacement pixels comprise
authentic background pixels, particularly if the target pixels are pixels constituting a representation of a moving object; and/or plausible background pixels, particularly if the target pixels are pixels constituting a representation of a non-moving object, wherein:

the authentic background pixels are directly derived from an actual texture imaged in one or more of the input images at the spot of the target pixels that are replaced by the replacement pixels; and the plausible background pixels are derived from texture imaged in one or more of the input images at or around the spot of the target pixels that are replaced by the replacement pixels, particularly wherein the plausible background pixels are computed using content awareness and/or machine learning.

14. The method according to claim 1, comprising detecting, in one or more of the input images, shadows of objects belonging to the target object class, representations of the shadows being constituted by shadow pixels, and replacing the shadow pixels by shadow replacement pixels, the texture assigned to the three-dimensional mesh comprising the shadow replacement pixels, wherein detecting the shadows is based on an intensity histogram in the vicinity of the target pixels, and/or comprises using a graph-cut algorithm.

15. The method according to claim 1, wherein the plurality of input images comprise at least 15 images;

the input images are captured by a plurality of cameras from different positions and with different orientations, the positions and orientations of the cameras relative to the general coordinate system being known, particularly wherein the plurality of cameras comprises at least five cameras; and/or the method comprises receiving depth information, wherein the depth information is used for generating the 3D model, particularly wherein at least a subset of the cameras is embodied as a stereo camera or as a range-imaging camera for providing the depth information.

16. A computer system comprising a processing unit and a data storage unit, wherein the data storage unit is configured to receive and store input data, to store one or more algorithms, and to store and provide output data, the input data particularly comprising input image data and 3D mesh data, the algorithms comprising at least one structure-from-motion algorithm, wherein the processing unit is configured to use the algorithms to generate, based on the input data, a texture and/or a textured mesh as output data by performing the method according to claim 15.

17. A computer program product comprising programme code which is stored on a non-tangible non-transitory machine-readable medium, and having computer-executable instructions for performing, when executed on a processing unit of a computer system, the method according to claim 15.

18. A computer system comprising a processing unit and a data storage unit, wherein the data storage unit is configured to receive and store input data, to store one or more algorithms, and to store and provide output data, the input data particularly comprising input image data and 3D mesh data, the algorithms comprising at least one structure-from-motion algorithm, wherein the processing unit is configured to use the algorithms to generate, based on the input data, a texture and/or a textured mesh as output data by performing the method according to claim 1.

19. A computer program product comprising programme code which is stored on a non-tangible non-transitory machine-readable medium, and having computer-executable instructions for performing, when executed on a processing unit of a computer system, the method according to claim 1.

* * * * *